(12) United States Patent
Berthaud et al.

(10) Patent No.: US 7,660,255 B2
(45) Date of Patent: Feb. 9, 2010

(54) SYSTEM AND METHOD FOR ROUTING IP DATAGRAMS

(75) Inventors: Jean Marc Berthaud, Loubet (FR); Jean Claude Dispensa, Saint Jeannet (FR); Arnaud Lund, Cagnes sur Mer (FR)

(73) Assignee: International Business Machines Corporation, Armonk, NY (US)

( * ) Notice: Subject to any disclaimer, the term of this patent is extended or adjusted under 35 U.S.C. 154(b) by 916 days.

(21) Appl. No.: 10/690,015

(22) Filed: Oct. 21, 2003

(65) Prior Publication Data

US 2004/0090955 A1    May 13, 2004

(30) Foreign Application Priority Data

Nov. 13, 2002    (EP)    .................................. 02368122

(51) Int. Cl.
*H04L 12/28* (2006.01)
(52) U.S. Cl. ....................................... 370/238; 370/401
(58) Field of Classification Search ................ 370/235, 370/400, 389, 316, 351, 356, 394, 254, 237, 370/238, 401, 468
See application file for complete search history.

(56) References Cited

U.S. PATENT DOCUMENTS

| | | | | | |
|---|---|---|---|---|---|
| 3,783,258 | A | * | 1/1974 | Chwastyk .................... | 708/404 |
| 6,084,864 | A | * | 7/2000 | Liron .......................... | 370/316 |
| 7,027,449 | B2 | * | 4/2006 | Garcia-Luna-Aceves et al. . | 370/401 |
| 7,133,365 | B2 | * | 11/2006 | Klinker et al. .............. | 370/238 |
| 2002/0095474 | A1 | * | 7/2002 | Boys .......................... | 709/217 |
| 2003/0026268 | A1 | * | 2/2003 | Navas ......................... | 370/400 |

* cited by examiner

*Primary Examiner*—Seema S Rao
*Assistant Examiner*—Wanda Z Russell
(74) *Attorney, Agent, or Firm*—Greenblum & Bernstein P.L.C.; Art Samodovitz

(57) ABSTRACT

A datagram with a destination network address is received at a router. The router identifies a next hop router en route to or associated with the destination network address. The router determines whether or not transmission of the datagram on a link to the next hop router would result in a bandwidth usage exceeding a bandwidth threshold associated with the next hop router. If not, the router updates the bandwidth usage associated with the next hop router to account for the datagram, and transmits the datagram to the next hop router. If so, the router selects among other possible next hop routers en route to or associated with the destination address, another next hop router for which transmission of the datagram on a link to the other next hop router would not result in a bandwidth usage exceeding a bandwidth threshold associated with the other next hop router. Then, the router updates the bandwidth usage associated with the other next hop router to account for the datagram, and transmits the datagram to the other next hop router. If, among the other possible next hop routers, there is no other next hop router for which the transmission of the datagram on the respective link would result in the bandwidth usage being less than the respective bandwidth threshold, then the router chooses among the other possible next hop routers, another next hop router. Then, the router updates the bandwidth threshold associated with the other, chosen next hop router with a larger, predefined bandwidth threshold.

14 Claims, 12 Drawing Sheets

Routing between Networks

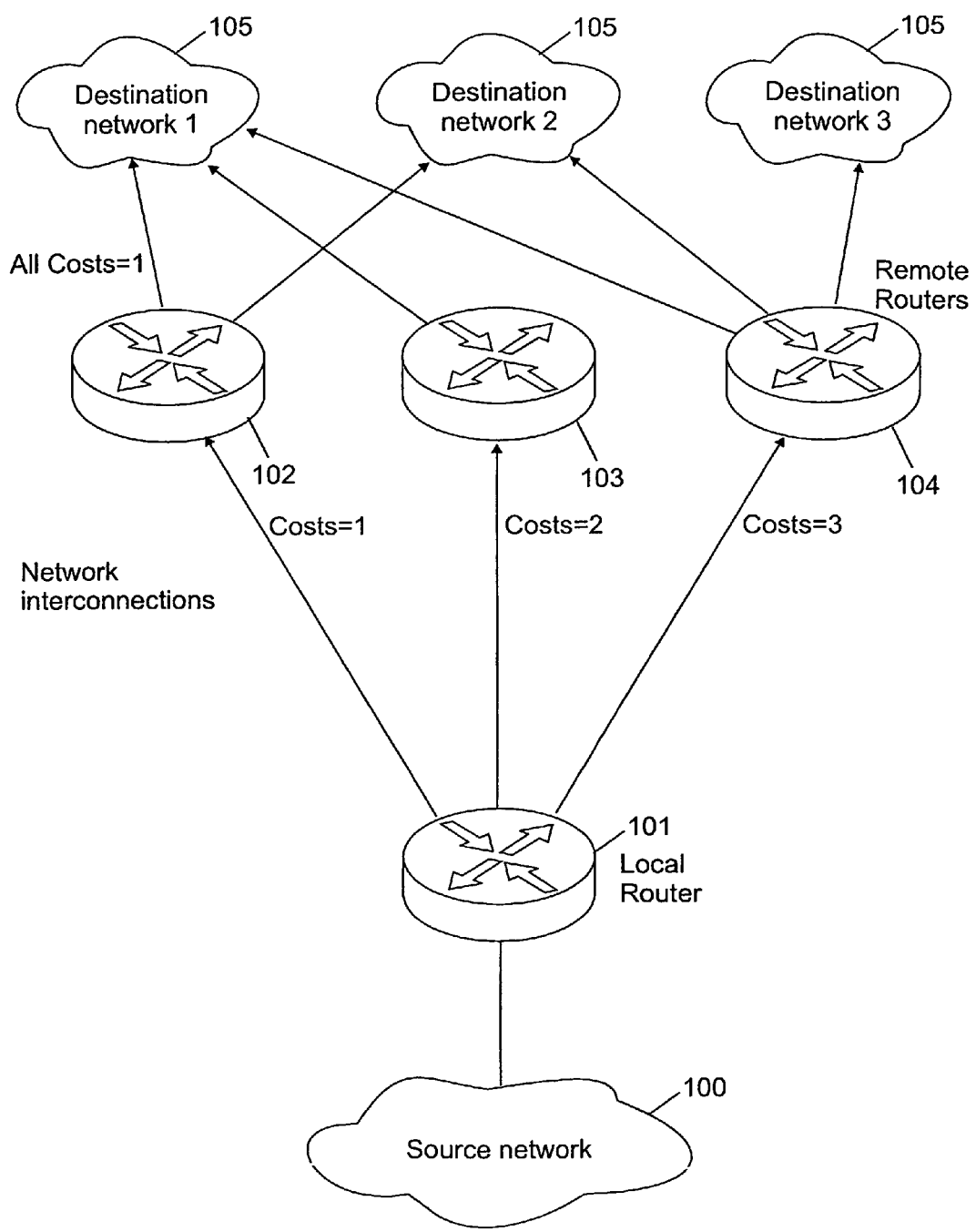
FIG. 1: Routing between Networks

Router 101, 102, 103, 104

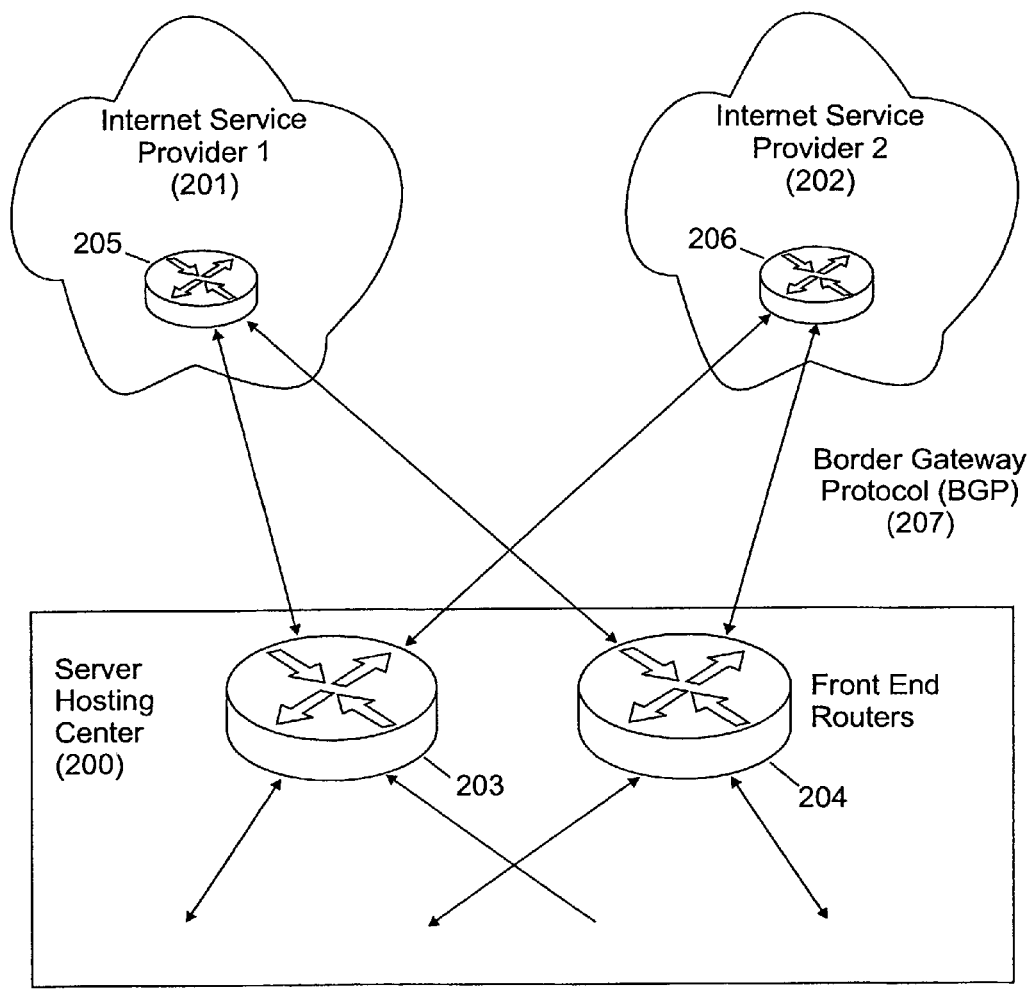
FIG. 2: Routing between a Server Hosting Center and Several Internet Service Providers

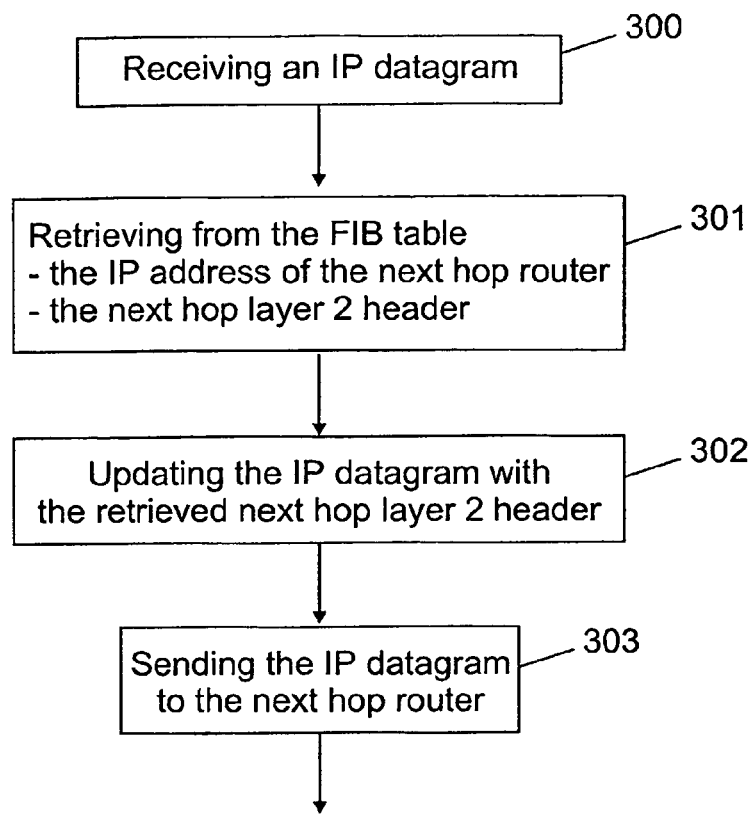
FIG. 3: Routing According to Prior Art

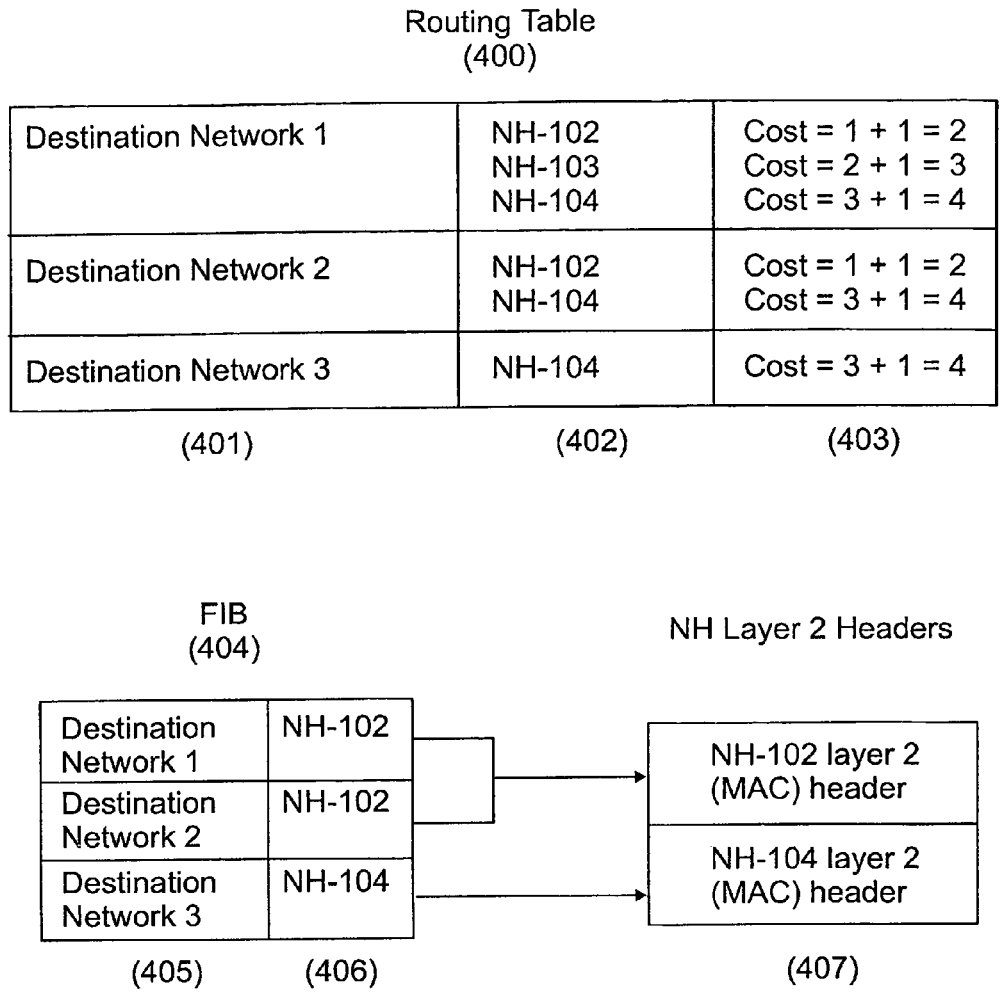
FIG. 4: Standard Routing Table and Forwarding Information Base According to Prior Art

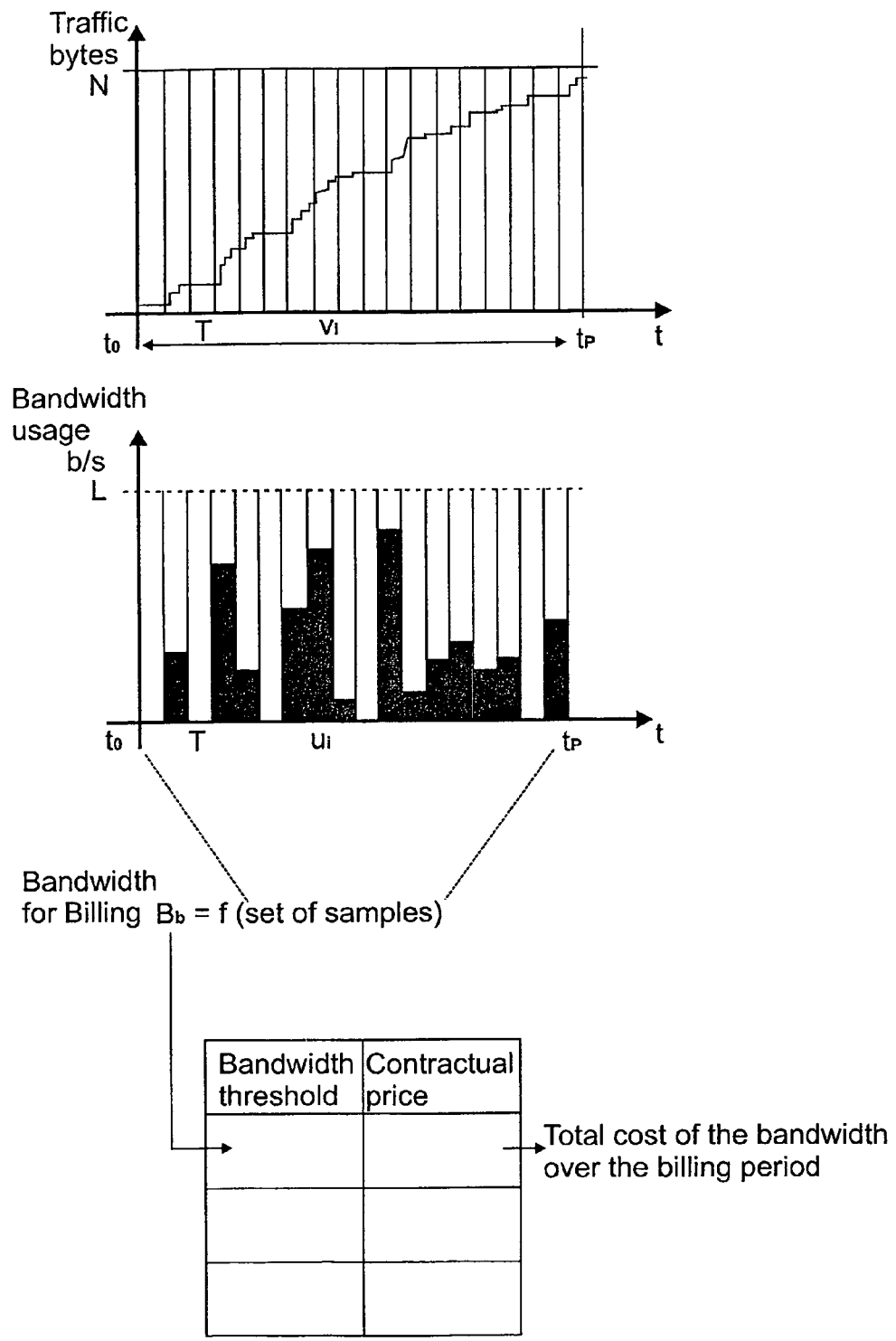
FIG. 6: Algoritm for Billing Bandwidth

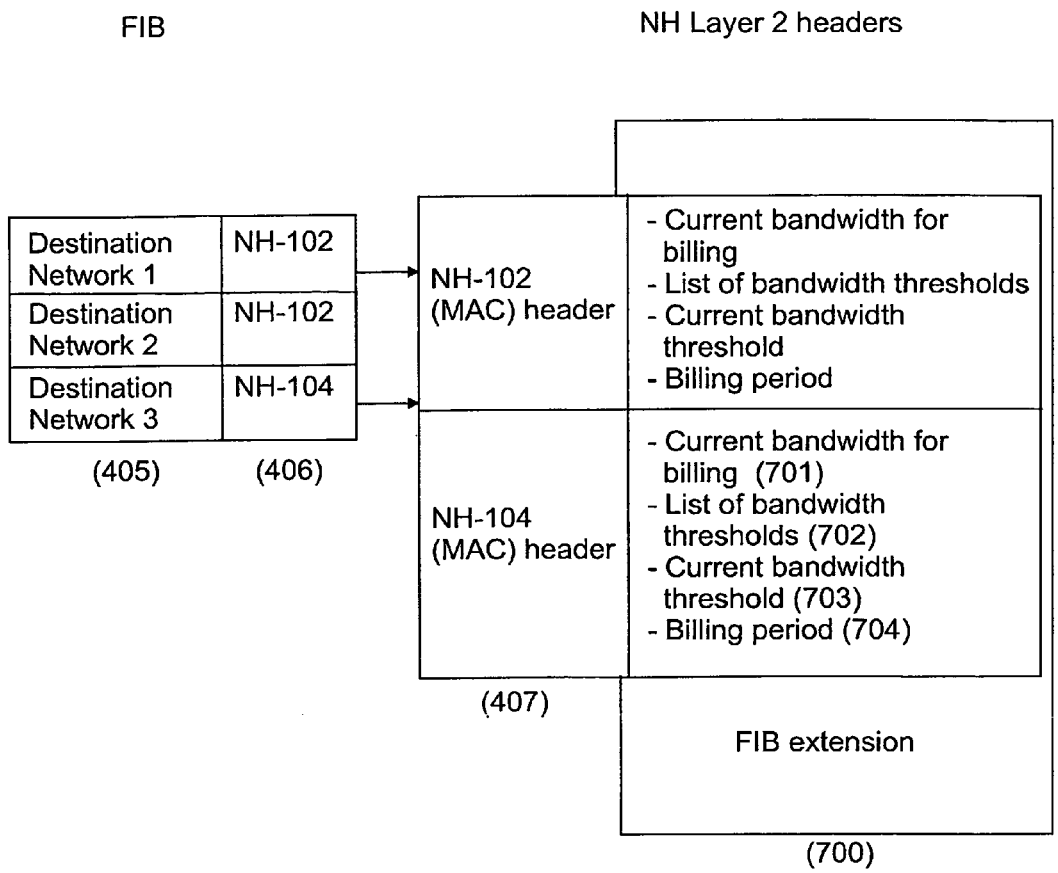
FIG. 7: Forwarding Information Base Extension According to the Present Invention

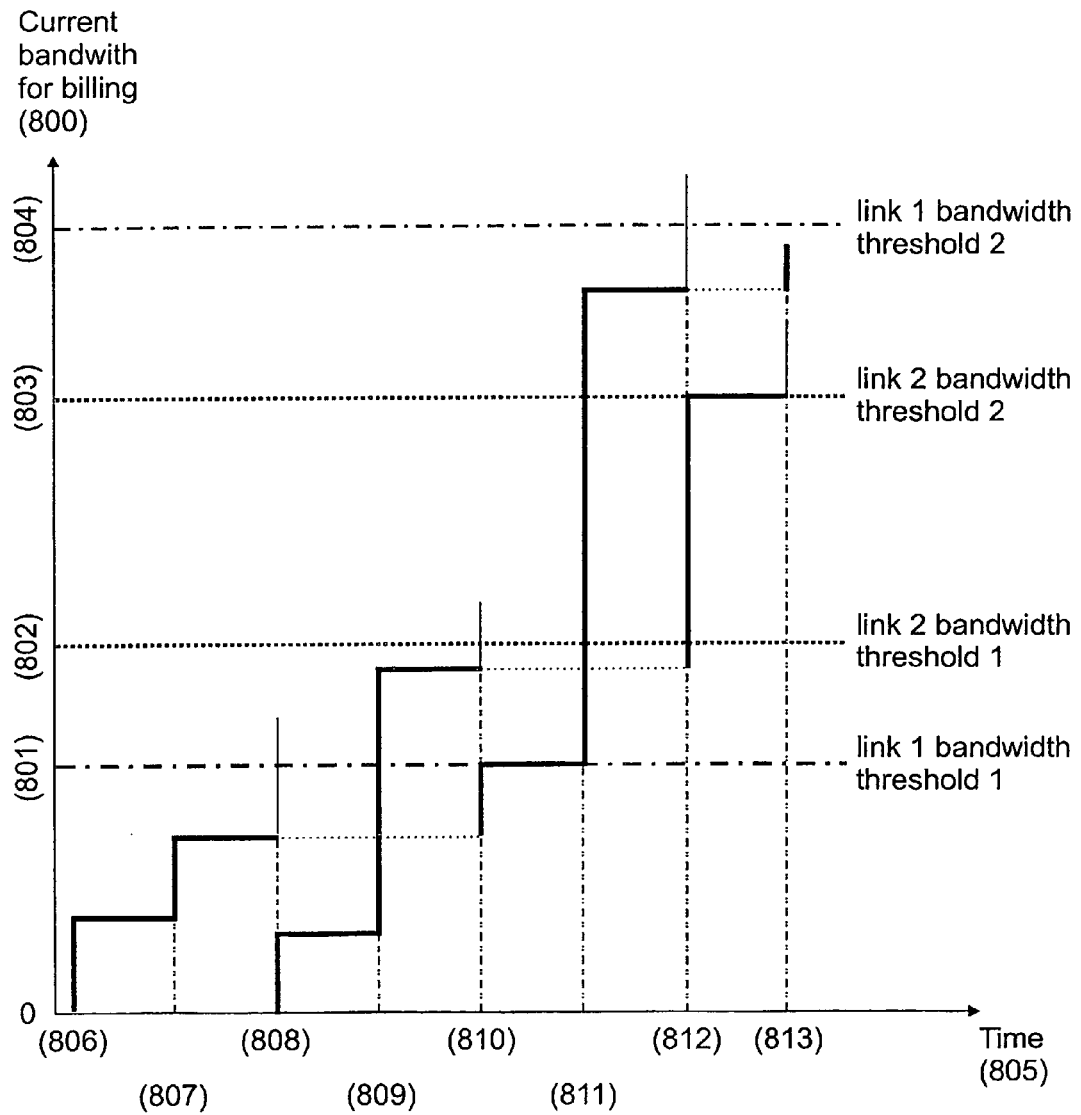
FIG. 8: Current Bandwidth for Billing per Link as a Function of the Time

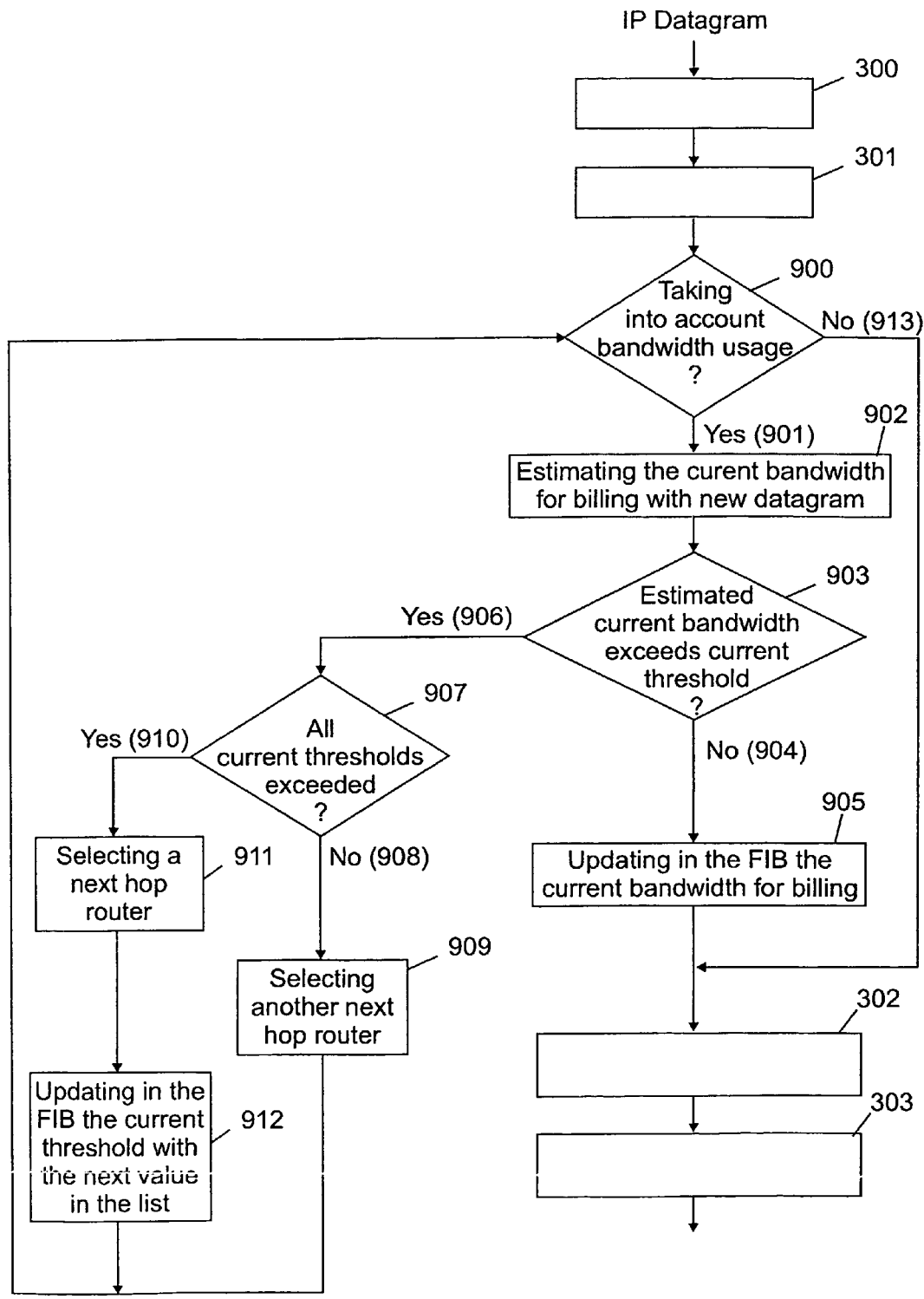
FIG. 9: Link Selection Algorithm

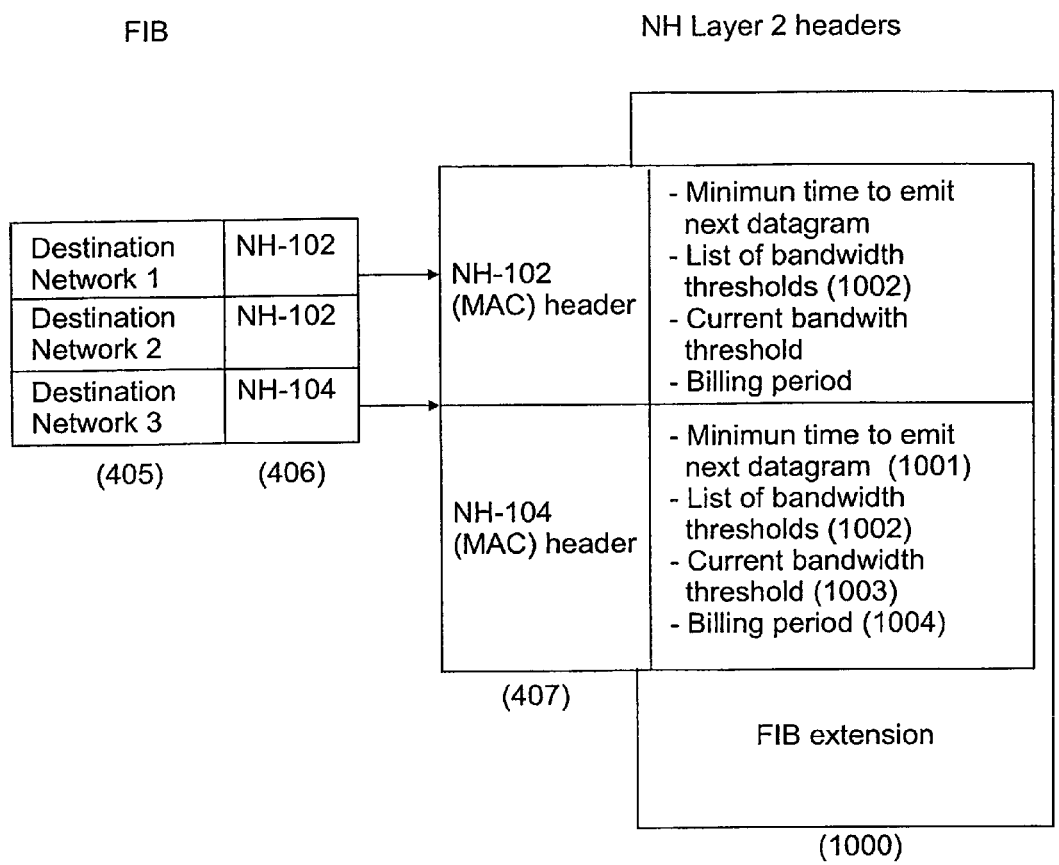
FIG. 10: Forwarding Information Base Extension According to Particular Embodiment

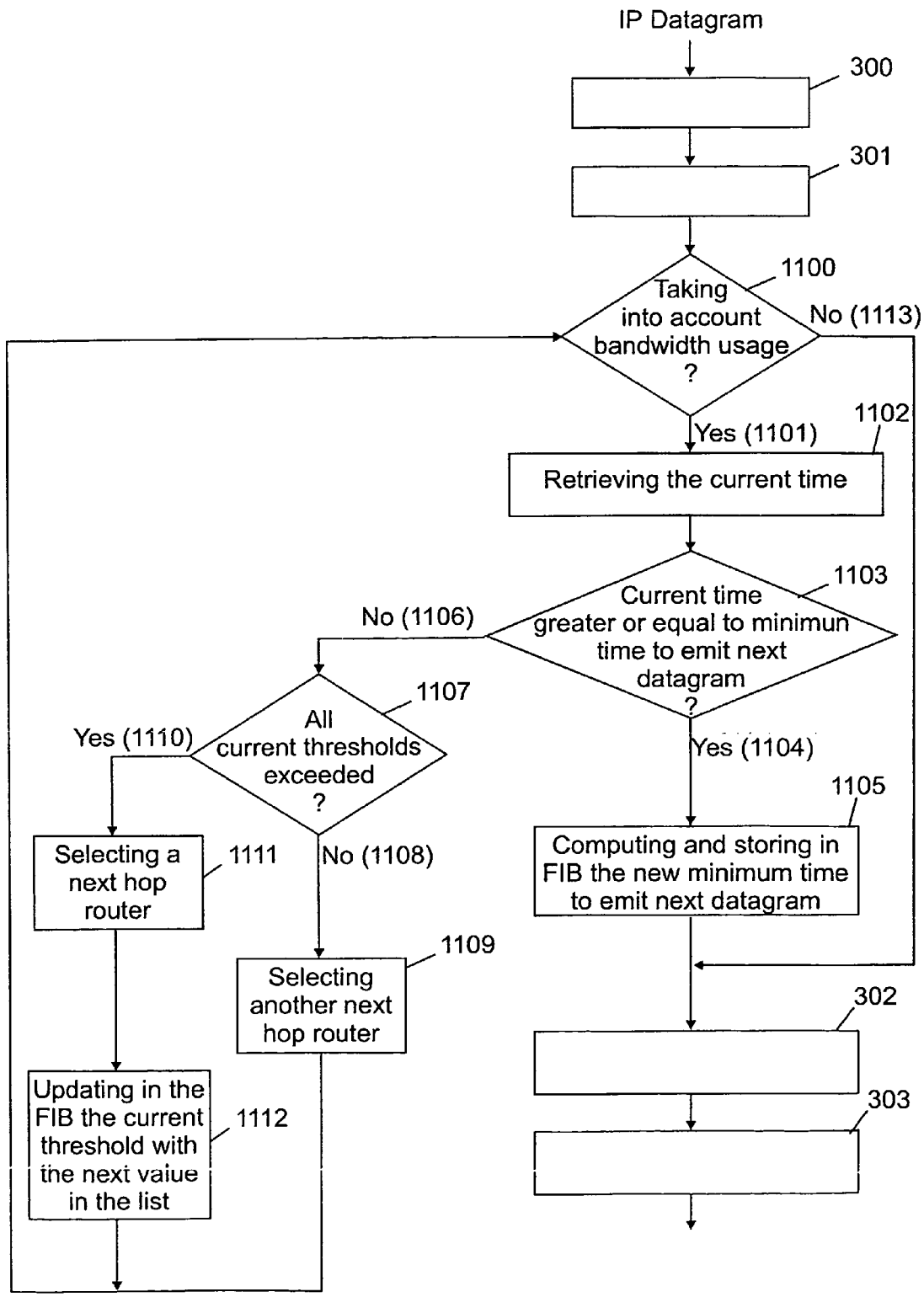
FIG. 11: Link Selection Algorithm According to a Particular Embodiment

SYSTEM AND METHOD FOR ROUTING IP DATAGRAMS

BACKGROUND OF THE INVENTION

The present invention relates generally to computer networks, and more particularly to a method and system, in an Internet Protocol (IP) network, for routing IP datagrams.

Internet

The Internet is a global network of computers and computers networks. The Internet connects computers that use a variety of different operating systems or languages, including UNIX, DOS, Windows, Macintosh, and others. To facilitate and allow the communication among these various systems and languages, the Internet uses a language referred to as TCP/IP ("Transmission Control Protocol/Internet Protocol"). TCP/IP protocol supports three basic applications on the Internet:
  transmitting and receiving electronic mail,
  logging into remote computers (the "Telnet"), and
  transferring files and programs from one computer to another ("FTP" or "File Transfer Protocol").

TCP/IP

The TCP/IP protocol suite is named for two of the most important protocols:
  a Transmission Control Protocol (TCP), and
  an Internet Protocol (IP).

Another name for it is the Internet Protocol Suite. The more common term TCP/IP is used to refer to the entire protocol suite. The first design goal of TCP/IP is to build an interconnection of networks that provide universal communication services: an "inter network", or "internet". Each physical network has its own technology dependent communication interface, in the form of a programming interface that provides basic communication functions running between the physical network and the user applications. The architecture of the physical networks is hidden from the user. The second goal of TCP/IP is to interconnect different physical networks to form what appears to the user to be one large network. TCP is a transport layer protocol providing end to end data transfer. It is responsible for providing a reliable exchange of information between 2 computer systems. Multiple applications can be supported simultaneously over one TCP connection between two computer systems. IP is an internetwork layer protocol hiding the physical network architecture bellow it. Part of the communicating messages between computers is a routing function that ensures that messages will be correctly directed within the network to be delivered to their destination. IP provides this routing function. An IP message is called an IP Datagram. Application Level protocols are used on top of TCP/IP to transfer user and application data from one origin computer system to one destination computer system. Such Application Level protocols are for instance File Transfer Protocol (FTP), Telnet, Gopher, Hyper Text Transfer Protocol (HTTP).

World Wide Web

With the increasing size and complexity of the Internet, tools have been developed to help find information on the network, often called navigators or navigation systems. Navigation systems that have been developed include standards such as Archie, Gopher and WAIS. The World Wide Web ("WWW" or "the Web") is a recent superior navigation system. The Web is:
  an Internet-based navigation system,
  an information distribution and management system for the Internet, and
  a dynamic format for communicating on the Web.

The Web seamlessly integrates format of information, including still images, text, audio and video. A user on the Web using a graphical user interface ("GUI", pronounced "gooey") may transparently communicate with different host computers on the system, and different system applications (including FTP and Telnet), and different information formats for files and documents including, for example, text, sound and graphics.

IP Router

One of the basic functions of IP is its ability to form connections between different physical networks. This is due to the flexibility of IP to use almost any physical network below it, and to the IP routing algorithm. A system that does this is termed a "router". A "Router" is a computer or other device that interconnects two networks and forwards messages from one network to the other. The Router thus includes a CPU and a computer readable storage device storing program instructions to be executed by the CPU (see FIG. 1A). Routers are able to select the best transmission path between networks. The basic routing function is implemented in the IP layer of the TCP/IP protocol stack, so any host (or computer) or workstation running TCP/IP over more than one interface could, in theory, forward messages between networks. Because IP implements the basic routing functions, the term "IP Router" is often used. However, dedicated network hardware devices called "Routers" can provide more sophisticated routing functions than the minimum functions implemented in IP.

IP Routing

When data is sent to a remote destination, each IP datagram is first sent to a local router. An incoming datagram that specifies a destination IP address other than one of the local router IP addresses is treated as a normal outgoing datagram. This outgoing datagram is subject to the IP routing algorithm of the router, which selects the next hop for the datagram. The router forwards each datagram towards its final destination. A datagram travels from one router to another until it reaches a router connected to the destination. Each intermediate router along the end-to-end path selects the next hop used to reach the destination. The next hop represents the next router along the path to reach the destination. This next router can be located on any of the physical networks to which the intermediate router is attached. If it is a physical network other than the one on which the host originally received the datagram, then the result is that the intermediate router has forwarded the IP datagram from one physical network to another. An "IP routing table" in each router is used to forward datagrams between networks. A basic IP routing table comprises information about the locally attached networks and the IP addresses of other routers located on these networks, plus the networks to which they attach. A routing table can be extended with information on IP networks that are farther away, and can also comprise a default route, but it still remains a table with limited information. A routing table represents only a part of the whole IP network. A router having such a routing table is called "a router with partial routing information". A robust routing protocol must provide the ability to dynamically build and manage information in the IP routing table. As the changes in the network topology may occur, the routing tables must be updated with minimal or without manual intervention.

IP Addressing

IP addresses are used by the IP protocol to uniquely identify a host on the Internet. Strictly speaking, an IP address identifies an interface that is capable of sending and receiving IP datagrams. Each IP datagram (the basic data packets that are exchanged between hosts) comprises a source IP address and a destination IP address. IP addresses are represented by a thirty two bit unsigned binary value which is usually expressed in a dotted decimal format. For example, 9.167.5.8 is a valid Internet address. An IP address is divided between a network and a host part, the first bits of the IP address specify how the rest of the address is divided. The mapping between the IP address and an easier-to-read symbolic name, for example myhost.ibm.com, is done by the "Domain Name System" (DNS).

Routing Algorithm

In the IP networking, one of the major issue to solve is to route the IP datagrams. For this reason, a routing table is built in each routing device. Routing tables are either statically configured by a network administrator or dynamically configured based on information exchanged between routers using routing protocols such as Routing Information Protocol -RIP-, Open Shortest Path First -OSPF-, Border Gateway Protocol -BGP-, . . . ). Dynamic routing algorithms allow routers to exchange route or link information, from which the best paths to reach destinations in an Inter network are calculated. Static routing is generally used to supplement dynamic routing. The goal of the routing function is to determine for each IP datagram, the next hop device in order to reach the final destination. The search for the next hop device is commonly based on the shortest path or shortest distance in order to minimize the transmission delay and resource consumption in the network.

Distance Vector Routing

The principle of Distance Vector Routing is very simple. Each router in an inter network maintains the distance from itself to every known destination in a Distance Vector Table. The Distance Vector Table comprises a plurality of destinations (vectors) associated with costs (distances) to reach them and defines the lowest distances to these destinations at the time of the transmission. The distances in the tables are computed from information provided by neighbour routers. Each router transmits its own Distance Vector Table across the shared network. The sequence of operations for doing this is as follows:

Each router is configured with an identifier and a cost for each of its network links. The cost is normally fixed at "one", reflecting a single hop, but can reflect other measurement taken for the link such as the traffic, speed, etc.

Each router is configured at the beginning of the process with a distance vector table comprising zero for itself, one for directly attached networks, and infinity for every other destination.

Each router periodically transmits its distance vector table to each of its neighbors. It can also transmit the table when the table changes.

Each router uses the information received from its neighbours to calculate its own distance vector table.

The total cost of each destination is calculated by adding the cost reported to it in a neighbor's distance vector table to the cost of the link to that neighbor.

The distance vector table (the routing table) for the router is then created by taking the lowest cost calculated for each destination.

The distance vector algorithm produces a stable routing table after a period directly related to the number of routers across the network.

One of the characteristic of the distance vector routing is that the distance is a static value pre-configured on each router interface. The distance is mostly chosen per default as being the number of hops (which equals the number of intermediate routers). This means that if, for instance, three intermediate routers are in the path between a source network and a destination network, the distance from this source network to the destination network seen by the router attached to the source network, is three. Once a router has found out the shortest distance to a destination network, the router will always use this route to reach the destination network.

More explanations about the technical field presented in the above sections can be found in the following publications incorporated herewith by reference: "TCP/IP Tutorial and Technical Overview" by Martin W. Murhammer, Orcun Atakan, Stefan Bretz, Larry R. Pugh, Kazunari Suzuki, David H. Wood, International Technical Support Organization, October 1998, GG24-3376-05.

Bandwidth Cost

Most server hosting centers have multiple Internet connections (at least two for redundancy reasons) provided by different Internet Service Providers (ISPs). The Border Gateway Protocol (BGP) is widely used to route the IP traffic between the different Internet service providers (ISPs) and the server hosting center. BGP is also used to advertise all the Internet routes to the different server hosting centers. For instance, the IP datagrams can be routed toward their final destination by the routing device, at the front end of the server hosting center, according to the shortest path. However, the shortest path is not always the most appropriate criterion in term of business needs. A very important parameter to take into consideration in the Internet world is the financial cost of the bandwidth based on the bandwidth usage. The standard way for an Internet Service Provider (ISP) to charge its customers (the server hosting centers) is the so called 95%-tile method. At regular intervals (for instance every five minutes), the bandwidth currently used (both inbound and outbound traffic) by the customer (the server hosting center) is measured and the result is saved by the Internet Service Provider (ISP). At the end of a billing period (this period is generally equal to one month), the Internet Service Provider (ISP) sorts out all the measurements, removes five percent of the measurements, the measurements with the highest values, and takes the next measurement as the value of the bandwidth used through his network. This value will be the base for billing the server hosting center. This bandwidth value has an associated cost depending on the range of bandwidth used. For example, a usage between zero and ten Mbps is charged "X" while a usage between ten and twenty Mbps is charged "Y" (with X<Y) and so on.

FIG. 1 is a general view of a network according to the prior art. The network comprises a source network 100 connected to three destinations networks 105 through a locally attached router 101 and a plurality of remote routers 102, 103 and 104. The routers exchange routing information related to the different destination networks using a variety of known routing protocols. The destination network may be either directly attached to the remote routers 102, 103 or 104, or attached to different layers of routers which are in turn connected to the remote routers 102, 103 or 104. A cost value is associated with each link between the routers. In the present example, it is supposed that the link between router 101 and router 102 has a cost of "one", the link between router 101 and router 103 has a cost of "two", and the link between router 101 and router 104 has a cost of "three". The links between the routers 102, 103, 104 and the destination networks have all a cost of "one".

Destination Network 1 can be reached from router 101 through router 102 (the total cost is then 1+1=2) or through router 103 (the total cost is then 2+1=3) or through router 104 (the total cost is then 3+1=4).

Destination Network 2 can be reached from router 101 through router 102 (the total cost is then 1+1=2) or through router 104 (the total cost is then 3+1=4).

Destination Network 3 can be reached from router 101 through router 103 (the total cost is then 3+1=4).

Typical Configuration

FIG. 2 shows a typical configuration where a Server Hosting Center 200 is connected to two different Internet Service Providers: ISP-1 201 and ISP-2 202. In the server hosting center 200, for redundancy reasons, two front end routers 203 and 204 are used to connect the routers 205 and 206 of the Internet Service Providers 201 and 202. In the present configuration, the Border Gateway Protocol (BGP) 207 is used by the different routers 203, 204, 205 and 206 to advertise all the Internet routes and networks. The routes and networks advertisements are dynamically stored in the routing table of each router. The IP datagrams are routed towards their final destination network by the routing devices, at the front end of the server hosting center. The routing is mostly executed according to the criterion of the shortest path.

Routing Table and Forwarding Information Base

According to prior art, the process for routing IP datagrams is based on the routing table or on a subset of the routing table commonly called Forwarding Information Base (FIB). While the routing table contains routing information that may never be used, the Forwarding Information Table (FIB) contains routing information for a destination network to which an IP datagram has already been routed. When an IP datagram is received, the router creates an entry in the Forwarding Information Base (FIB) including the following information:

an identification of the destination network, and an identification of the next hop router to reach this destination network.

As shown in FIG. 4, the basic information in the Forwarding Information Base (FIB) 404 is a list of destination networks 405, each destination network being identified with an IP address, and each IP address being associated with a next hop router (NH) 406. The full routing table 400 associates:

with each destination network 401, all the possible next hop routers 402 and with each next hop router 402 a distance (or cost) 403, while the FIB associates with each destination network, only one next hop router (NH), generally the next hop router (NH) with the lower associated cost.

Each IP datagram to route contains a destination network IP address. The router searches in the FIB, for the IP address of the next hop router associated with this destination network IP address. The FIB comprises for each destination network 405 IP address:

the IP address (NH-102 or NH-104) 406 of the next hop router (NH); and the associated layer two header of the next hop router (NH). In a preferred embodiment, the FIB comprises a pointer to an entry in a Layer two Table 407. The entry comprises the layer two header for identifying the next hop router (NH). The layer two is also called MAC or Medium Access Control layer in the OSI model. The layer two header (also called MAC header) comprises the physical hardware address (also called MAC address) of the next hop router.

Routing

As shown in FIG. 3, the method for routing an IP datagram according to the prior art comprises the steps of:

Step 300: receiving an IP datagram and identifying the destination network IP address of this IP datagram.

Step 301: retrieving:
  from the FIB, the IP address of the next hop router (NH) associated with the destination network address of the IP datagram; and
  from the associated Layer two Table, the next hop layer two header. The header comprises the physical hardware address (also called MAC address) of the next hop router.

Step 302: updating the header of the IP datagram with the next hop (NH) layer two header previously retrieved.

Step 303: sending the IP datagram with the updated header to the next hop router (NH).

Bandwidth Pricing Model

The pricing model exercised by the Internet Service Providers (ISPs) can consist of a fixed price corresponding to a committed rate, paid whether or not it is used. It can also be based on a bandwidth usage calculated from periodical sampling the traffic during the billing period. Or it can be a mix of the two, with a guaranteed part that is always paid and a variable part that is charged depending on the bandwidth usage.

Terminology and Assumptions

P: Billing period. Usually one month.

N: Number of bytes emitted (or received) over the billing period P.

L: Physical line speed.

T: Observation period for traffic sampling. A common value is 5 minutes.

K=P/T=The number of observation periods in the billing period. Typically, for P=1 month and T=5 minutes, K is 8640 for a month of 30 days.

$B_b$=Bandwidth value chosen for billing (for instance, a customer or a Server Hosting Center when the bandwidth is provided by an Internet Service Provider).

To simplify, it is assumed that at the beginning of each billing period P, each structure holding data, like counters or sets of bandwidth values, is reset to zero.

Traffic

From a mathematical point of view, a packet based traffic like IP is a succession of data bursts emitted at line speed. The traffic is mainly characterised by:
the length of data bursts (datagram size), and
the inter-spacing between data bursts (datagram rate).

Such a traffic is described by a series of events $(t_i, dn_i)$, where $t_i$ is within the billing period P ($t_0 < t_i < t_p$ with $t_p - t_0 = P$), and $dn_i$ is a positive non zero integer.

A series of events $(t_i, dn_i)$ corresponds to the time $t_i$ at which a datagram of size $dn_i$ bits begins its transmission on the line (or the time at which full reception terminates depending on the observation point). By cumulating the events, as shown in FIG. 5a, this results in a curve n(t) with the following properties:
$n(t_0) = 0$ bits and $n(t_p) = N$ bits,
t is within the billing period P,
n(t) values are positive integers,
n(t) is a non continuous function (and cannot be derived).

Traffic Observation—Sampling

Routers and other network data devices do not provide n(t). It would be too costly in terms of memory and processing time. Instead, they provide sets of counters, for instance for counting the number of transmitted bits (or received bits). Consequently, traffic is observed by regularly sampling the values of these counters. As shown in FIG. 5b, this is represented by a series V of K+1 terms $v_0, v_1, \ldots, v_K$, where:
K=P/T;
$t_i = i.T$;
i is a positive integer $\epsilon [0, \ldots, K]$;
$v_i = n(i.T)$. It is easy to see that $v_0 = 0$ and $v_K = N$.

Bandwidth Usage

Microscopic view: Since data is emitted at line speed L, the curve of the bandwidth usage as shown in FIG. 5c, comprises a succession of intervals with a bandwidth value equal to L and a length equal to the size of the datagram that is transmitted, spaced by intervals of zero bits per second.
Macroscopic view: This view considers that the bandwidth used over a short period of time T, is equal to the amount of data transmitted during this period of time divided by T. To avoid any micro aspect of the bandwidth usage curve, the period of time T is chosen sufficiently long compared to the time required to transmit on the line a datagram at speed L. Practically, the macroscopic curve of the bandwidth usage as shown in FIG. 5d is built using the regularly observed samples of n(t) mentioned previously. The curve can be represented by a series U of K terms $u_1, \ldots, u_K$, where $u_i = (v_i - v_{i-1})/T$ (in bits per second). This macroscopic curve (shown in FIG. 5d) represents the density of the microscopic curve (shown in FIG. 5c) with regard to the observation intervals, and when T→0, the preceding microscopic view is retrieved.

For a single traffic curve n(t), even when considering only T such as P/T=K is a positive non zero integer, there are an infinity of possible bandwidth usage curves. Practically, T must be sufficiently long to avoid micro effects, and not too short compared to the billing period P so that the amount of accumulated data, and the traffic generated to get them, are manageable. T must not be too long in order to see bursts of data packets. As said before, it is frequent to have T=five minutes and K=8640 numbers to store over a period of thirty days.

Bandwidth for Billing

The next logical step after gathering bandwidth usage data is to compute a bandwidth value $B_b$ for billing. The algorithm to compute the value $B_b$ is generally chosen as:
being calculable;
producing a number that takes into account bursts;
not being too complex;
being understood.
Mean value over the billing period
    For instance, a simple algorithm consists in computing $B_b$ equal to N/P. In this particular case, $B_b$ is only a mean value which does not takes into account the bursts or more generally of the bandwidth usage. A customer can concentrate all his traffic on the first days of the billing period or on specific hours of the day and can do nothing the rest of the time or just have a regular flat traffic during the whole billing period: the value $B_b$ will be the same.
Bandwidth usage
    The algorithms used by the Internet Service Providers are frequently based on the bandwidth usage observed during the billing period. In this case and as shown in FIG. 6, the bandwidth for billing $B_b$ is a function f of the series U defined previously:
    $B_b = f(u_1, \ldots, u_K)$. The algorithm for computing $B_b$ can be based either on all the values $u_i$ of the series U (weighted average algorithm) or on only a limited set of values (95 or 90 percentile algorithm).
95 or 90 percentile
    A percentile is a value on a scale of one hundred that indicates the percent of a distribution that is equal to or below it. The bandwidth 95 or 90 percentile of the traffic observed during the billing period is calculated from the bandwidth usage curve. An ordered series S of K terms $s_1, \ldots, s_k$ is built where:
    S is a permutation of the series U (previously defined);
    $\forall (i,j) \epsilon [1, \ldots, K]^2$, for $i < j$, $s_i < s_j$.
    A simple definition of the 95 percentile is the following: $B_{b95} = S_{E[0.95K]+1}$, where
    E[x] is the integer part of x (x being a real number).
    In the literature, the following definitions can also be found:
    $B_{b95} = S_{E[0.95K]}$, or
    $B_{b95} = (E[0.95K]+1-0.95K).S_{E[0.95K]} + (0.95K-E[0.95K]).S_{E[0.95]+1}$, which is a linear interpolation between two values.
    The bandwidth value for billing according to the 95 or 90 percentile algorithm as used by most Internet Service Providers (ISPs):
    is simple to compute,
    is not too expensive to process,
    is difficult to anticipate for the customer,
    depends on 5% of the traffic. The remaining traffic has no impact on the billing.
Weighted average
    This method computes a value $B_b$ from the bandwidth usage series U by assigning a weight $w_i$ to each bandwidth value $u_i$. This is expressed as:

$$B_b = \frac{\sum w_i, u_i}{\sum w_i}$$

Assigning a same weight to each bandwidth value is equivalent of calculating a mean value. In general, the cost is a function of the bandwidth value. Many possibilities can be considered such as:

defining the weight as an increasing function of the bandwidth value to give more importance to the highest bursts that consume more resources, defining the weight as equal to the bandwidth value:

$$B_b = \frac{\sum u_i^2}{\sum u_i}$$

The Value $B_b$:

can be easily computed because it only relies on additions and multiplications.

is easily understandable, and takes into account both burst periods and periods where the traffic is low.

In order to optimize the connection costs, the bandwidth usage should represent a very important aspect of the routing in a server hosting center and should be a key decision factor on top of the traditional routing algorithms based on the shortest path.

An object of the present invention is to optimize connection costs in an IP network.

SUMMARY OF THE INVENTION

The invention resides in a system, method and computer program product for routing a datagram in an IP network. A datagram with a destination network address is received at a router. The router identifies a next hop router en route to or associated with the destination network address. The router determines whether or not transmission of the datagram on a link to the next hop router would result in a bandwidth usage exceeding a bandwidth threshold associated with the next hop router. If not, the router updates the bandwidth usage associated with the next hop router to account for the datagram, and transmits the datagram to the next hop router. If so, the router selects among other possible next hop routers en route to or associated with the destination address, another next hop router for which transmission of the datagram on a link to the other next hop router would not result in a bandwidth usage exceeding a bandwidth threshold associated with the other next hop router. Then, the router updates the bandwidth usage associated with the other next hop router to account for the datagram, and transmits the datagram to the other next hop router.

According to one feature of the present invention, if, among the other possible next hop routers, there is no other next hop router for which the transmission of the datagram on the respective link would result in the bandwidth usage being less than the respective bandwidth threshold, then the router chooses among the other possible next hop routers, another next hop router. Then, the router updates the bandwidth threshold associated with the other, chosen next hop router with a larger, predefined bandwidth threshold.

BRIEF DESCRIPTION OF THE DRAWINGS

FIG. 1 is a block diagram of a computer system comprising a source network and a plurality of destinations networks interconnected by means of routers, according to the Prior Art.

FIG. 2 is a block diagram of a server hosting center connected to two different Internet Service Providers (ISPs), according to the Prior Art.

FIG. 3 is a flow chart illustrating routing an IP datagram in a router according to the Prior Art.

FIG. 4 shows a Forwarding Information Base (FIB) and an associated Layer two Table used for routing IP datagrams according to the Prior Art.

FIG. 6 shows an algorithm used by Internet Service Providers for billing for bandwidth usage.

FIG. 7 shows a Forwarding Information Base (FIB) and an associated Layer two Table used for routing IP datagrams according to the present invention.

FIG. 8 shows current bandwidth for billing as a function of time on two different links according to the bandwidth thresholds defined for each link.

FIG. 9 is a flow chart illustrating a method for selecting a link to route a datagram to a next hop router according to the present invention.

FIG. 10 shows a Forwarding Information Base (FIB) and an associated Layer two Table used for routing IP datagrams according to one embodiment of the present invention.

FIG. 11 is a flow chart illustrating different steps of the method for selecting a link to route a datagram to a next hop router according to one embodiment of the present invention.

DETAILED DESCRIPTION OF THE PREFERRED EMBODIMENTS OF THE PRESENT INVENTION

Figure 1A:
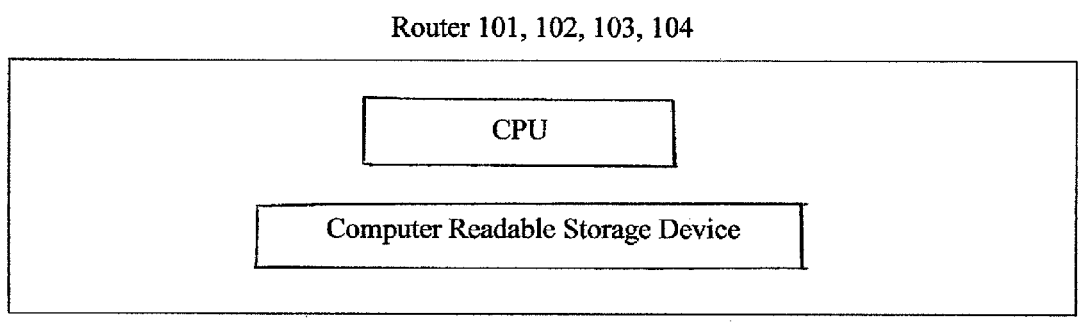
FIG. 1A shows that each Router can include a CPU and a computer readable storage device storing program instructions to be executed by the CPU.
Figure 5A:
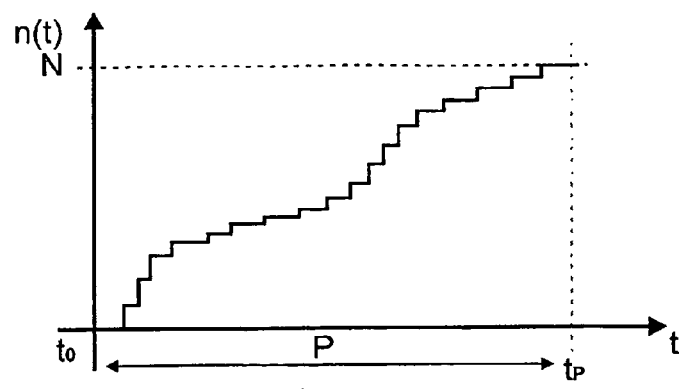
FIG. 5a is a graph illustrating packet based traffic on a link.
Figure 5B:
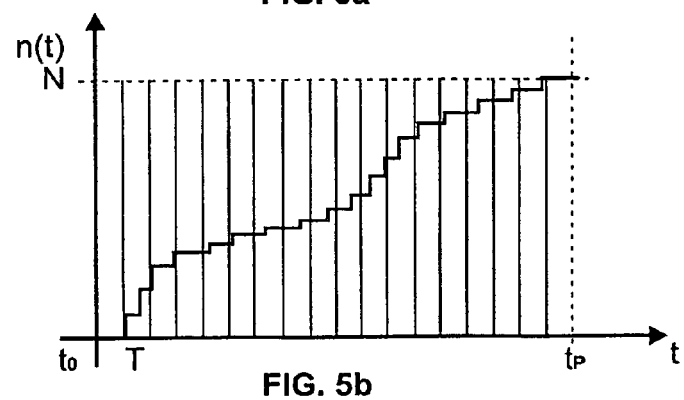
FIG. 5b is a graph illustrating sampling of the packet based traffic on the link.
Figure 5C:
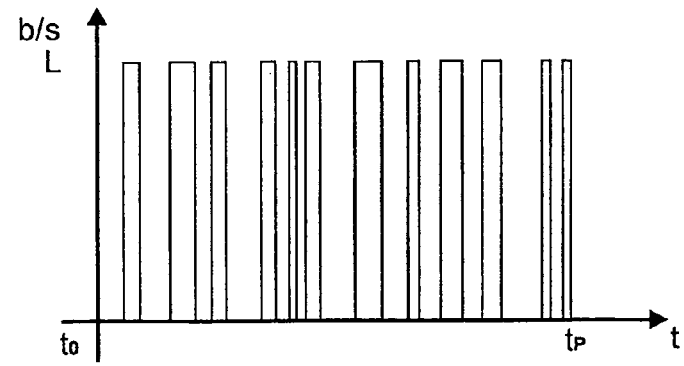
FIG. 5c is a microscopic view of bandwidth usage on the link.
Figure 5D:
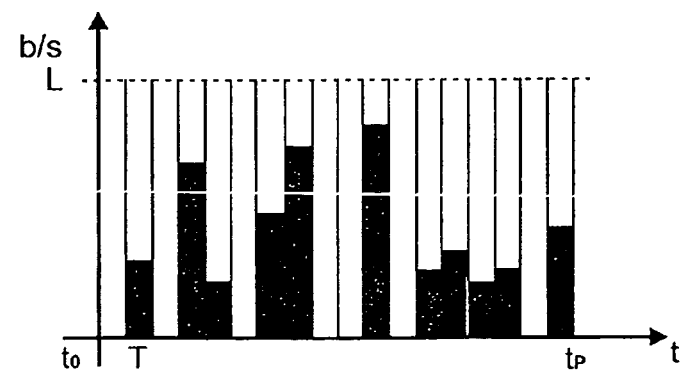
FIG. 5d is a macroscopic view of bandwidth usage on the link.

The present invention routes IP traffic to several next hop routers according to current bandwidth usage on links connecting these next hop routers. The object of the present invention is to change the routing decision process executed in the routers so that the decision does not only depend on a distance or cost to a destination network but also depends on a bandwidth usage as billed by Internet Services Provides (ISPs) on the links to next hop routers.

Forwarding Information Base

As in the prior art, the Forwarding Information Base (FIB) comprises for each destination network:

the IP address of the next hop router (NH); and the associated layer 2 header of the next hop router (NH).

According to the present invention, as described in FIG. 7, for each link to next hop router (NH), additional information is used to route traffic:

a current bandwidth for billing 701;

a list of bandwidth thresholds 702;

a current bandwidth threshold 703;
a billing period 704.

In a preferred embodiment, the additional information 700 is stored in the Forwarding Information Base (FIB). In a particular embodiment this information is stored in the Layer two Table associated with the Forwarding Information Base (FIB).

Current Bandwidth for Billing

The current bandwidth for billing 701 on the link $l_i$ connecting the next hop router ($NH_i$) is computed each time a new datagram must be transmitted. The current bandwidth for billing $B_{bc}$ can be defined as:
being equal to the bandwidth for billing $B_b$ at time $t_c$ or
being an approximation of the bandwidth for billing $B_b$ at time $t_c$.

In particular, the current bandwidth for billing $B_{bc}$ can be defined as a function f' of a series of K terms $u_1, \ldots, u_{E[c]}$, $u'_{E[c]+1}$, wherein:
$t_c$ is within the billing period P;
c is a real number comprised between 0 and K (0<c<K);
E[c] is the integer part of c;
$t_0+T.E[c] \leq t_c < t_0+T.(E[c]+1)$
the series $u_1, \ldots, u_{E[c]}$ comprises the first E[c] terms of the series U.
the term $u'_{E[C]+1}$ is function of the datagrams transmitted during the time interval : $t_{E[c]} < t \leq t_c$.

The current bandwidth for billing can be defined as equal to $B_{bc}=f'(u_1, \ldots, u_{E[c]}, u'_{E[c]+1})$ wherein:
the function f' increases with the time within the billing period.
$B_{bc}$ for $t_c=t_p$ is lower or equal to the bandwidth for billing $B_b$:
$f'(u_1, \ldots, u_K) \leq f(u_1, \ldots, u_K)$.

For instance, the value $B_{bc}$ according to the mean value algorithm can be defined as equal to:

$$B_{bc}=[(u_1+\ldots+u_{E[c]})+(u'_{E[c]+1})]/K=N_c/P \text{ wherein}$$

$N_c$=number of bits corresponding to datagrams that have been transmitted during the time period between to and the current time $t_c$ ($N_c<N$).
P=billing period.

Thus, the minimum bandwidth for billing ($B_{bc}=N_c/P$) is an increasing function with the time.

List of Bandwidth Thresholds

The list of bandwidth thresholds 702 on the link $l_i$ connecting the next hop router ($NH_i$) is a configured set of values based on the pricing model of the Internet Service Provider. At the end of the billing period, once the bandwidth for billing $B^i_b$ (which is an indication of the bandwidth usage) is calculated, a contractual price (or cost) is applied. A contractual price for a predefined bandwidth interval is a fixed price applied by the Internet Service Provider whatever the value of the bandwidth for billing is within this predefined bandwidth interval. As the pricing model of most Internet Service Providers is based on a plurality of contractual prices $C_{thj}$ depending on the bandwidth usage, several different bandwidth thresholds are defined. For instance, for link $l_i$, a first contractual price "$C^i_{th1}$" can be applied for values of $B^i_b$ between 0-10 Mbps, a second contractual price "$C^i_{th2}$" can be applied for a value of $B^i_b$ between 10-20 Mbps, and a third contractual price "$C^i_{th3}$" can be applied for a value of $B^i_b$ between 20-30 Mbps, etc . . . In this example, the following bandwidth threshold are defined : $B^i_{th1}=10$ Mbps, $B^i_{th2}=20$ Mbps, $B^i_{th3}=30$ Mbps, etc . . . Each time the bandwidth value for billing $B^i_b$ will exceed a given bandwidth threshold, a different contractual price will be applied by the Internet Service Providers. For instance, if at the end of the billing period, $B^i_{thj-1}<B^i_b \leq B^i_{thj}$, then the total price to pay will be equal to $C^i_{thj}$.

Current Bandwidth Threshold

The current bandwidth threshold 703 on the link $l_i$ connecting the next hop router is a variable which can only take discrete values comprised in the list of bandwidth thresholds. If the list of bandwidth thresholds comprises the values: $\{B^i_{th1}=10, B^i_{th2}=20, B^i_{th3}=30\}$, the current bandwidth threshold can only take the values 10, 20 and 30 Mbps.
  At the beginning of the billing period, the current bandwidth threshold is defined equal to the first (lowest) value in the list of bandwidth thresholds.
  If the transmission of a new datagram results in exceeding the current bandwidth threshold of each link, the algorithm, according to the present invention, selects a link and the current bandwidth threshold of this selected link is set equal to the next value in the list of bandwidth thresholds.

Billing Period

The billing period 704 is a configured value (for example one month) based on the pricing model of the Internet Service Provider on the link to the next hop router.

Routing According Bandwidth Usage

The pricing model of most Internet Service Providers divides the bandwidth in several contiguous intervals and associates a contractual price with each of these bandwidth intervals. For instance, on link $l_i$, a cost $C^i_{th1}$ is associated with bandwidth interval 0-10 Mbps, a cost $C^i_{th2}$ with interval 10-20 Mbps, a cost $C^i_{th3}$ with interval 20-30 Mbps, etc . . . . In the present example, the list bandwidth thresholds values for link $l_i$ to next hop router NHi, comprises the following values: $B^i_{th1}=10$ Mbps, $B^i_{th2}=20$ Mbps, $B^i_{th3}=30$ Mbps, etc . . .

According to the present invention, at the beginning of the billing period, the current bandwidth thresholds of the links connecting the various next hop routers are initialized with the first value $B^i_{th1}$ (10 Mbps) in the lists bandwidth thresholds. Up to the current bandwidth threshold $B^1_{th1}$ (from 0 to 10 Mbps), a first next hop router (NH1) is used to route the datagrams. Once the current bandwidth for billing $B^1_{bc}$ has reached this current bandwidth threshold $B^1_{th1}$ (10 Mbps) with this first next hop router (NH1), a second next hop router (NH2) is used. However, the current bandwidth for billing $B^2_{bc}$ of the link $l_2$ connecting this second next hop router NH2 must also be taken into account. If the current bandwidth threshold $B^2_{th1}$ for this second next hop router NH2 is reached, the next hop router NH1 can be selected again until the second bandwidth threshold $B^1_{th2}$ of NH1 (20 Mbps in the example) is reached and so on.

The mechanism previously described is illustrated in FIG. 8. The graphic shows the current bandwidth for billing ($B^1_{bc}$ & $B^2_{bc}$) 800 on each link as a function of the time t (805). In the present example, the current bandwidth for billing is defined as an increasing function. On the Bandwidth line (y-axis), the first two bandwidth thresholds ($B^1_{th1}$ & $B^1_{th2}$) for link $l_1$ 801 and 804 and the first two bandwidth thresholds ($B^2_{th1}$ & $B^2_{th2}$) for link $l_2$ 802 and 803 are shown.

At time 806, a first datagram must be routed. The list of possible next hop routers (NH) is in the Routing Table with the associated "costs" or "distances". In a preferred embodiment, the next hop router with the lowest cost or shortest distance is selected. In the present example, the first datagram is routed on link $l_1$. The current bandwidth for billing $B^1_{bc}$ on link $l_1$ increases but remains below the current bandwidth threshold $B^1_{th1}$ defined for link $l_1$.

At time 807, a new datagram is routed on link $l_1$. The current bandwidth for billing $B^1_{bc}$ on link $l_1$ increases but remains below the current bandwidth threshold $B^1_{th1}$ defined for link $l_1$.

At time 808, a new datagram must be routed. The current bandwidth for billing $B^1_{bc}$ on link $l_1$ is estimated taking into account the transmission of this new datagram. The estimated current bandwidth for billing $B^1_{bc}$ is then compared with the current bandwidth threshold $B^1_{th1}$ defined for the link $l_1$. As the transmission of this new datagram on link $l_1$ would result for the current bandwidth for billing $B^1_{bc}$ exceeding the current bandwidth threshold $B^1_{th1}$ defined for link $l_1$ link $l_2$ is chosen to route the datagram. The current bandwidth for billing on link $l_2$ is calculated with this new datagram and increases. However, it remains below the current bandwidth threshold $B^2_{th1}$ defined for link $l_2$.

At time 809, a new datagram is routed on link $l_2$. The current bandwidth for billing $B^2_{bc}$ on link $l_2$ increases but remains below the current bandwidth threshold $B^2_{th1}$ defined for link $l_2$.

At time 810, a new datagram must be routed. The current bandwidth for billing $B^2_{bc}$ on link $l_2$ is estimated taking into account the transmission of this new datagram. The estimated current bandwidth for billing $B^2_{bc}$ is then compared with the current bandwidth threshold $B^2_{th1}$ defined for the link $l_2$. As the transmission of this new datagram on link $l_2$ would result for the current bandwidth for billing $B^2_{bc}$ exceeding the current bandwidth threshold $B^2_{th1}$ defined for link $l_2$, link $l_1$ is chosen again to route the datagram. The current bandwidth for billing on link $l_1$ is calculated with this new datagram and increases. However, it remains below the current bandwidth threshold $B^1_{th1}$ defined for link $l_1$.

At time 811, a new datagram must be routed.

The current bandwidth for billing $B^1_{bc}$ on link $l_1$ is estimated taking into account the transmission of this new datagram. The estimated current bandwidth for billing $B^1_{bc}$ is then compared with the current bandwidth threshold $B^1_{th1}$ defined for the link $l_1$. The transmission of this new datagram on link $l_1$ would result for the current bandwidth for billing $B^1_{bc}$ exceeding the current bandwidth threshold $B^1_{th1}$ defined for link $l_1$.

The current bandwidth for billing $B^2_{bc}$ on link $l_2$ is estimated taking into account the transmission of this new datagram. The estimated current bandwidth for billing $B^2_{bc}$ is then compared with the current bandwidth threshold $B^2_{th1}$ defined for the link $l_2$. The transmission of this new datagram on link $l_2$ would also result for the current bandwidth for billing $B^2_{bc}$ exceeding the current bandwidth threshold $B^2_{th1}$ defined for link $l_2$.

As the current bandwidth for billing of each link (both links $l_1$ and $l_2$) has reached the value of the first bandwidth threshold in its list of bandwidth thresholds, a link (in this example link $l_1$ again) is chosen in the set of possible links for routing the datagram. The current bandwidth threshold of link $l_1$ is set equal to the next value $B^1_{th2}$ in the list. The current bandwidth for billing on link $l_1$ increases while remaining below the updated current bandwidth threshold (which is now $B^1_{th2}$).

At time 812, a new datagram must be routed.

The current bandwidth for billing $B^1_{bc}$ on link $l_1$ is estimated taking into account the transmission of this new datagram. The estimated current bandwidth for billing $B^1_{bc}$ is then compared with the current bandwidth threshold $B^1_{th2}$ previously defined for the link $l_1$. The transmission of this new datagram on link $l_1$ would result for the current bandwidth for billing $B^1_{bc}$ exceeding the current bandwidth threshold $B^1_{th2}$ defined for link $l_1$.

The current bandwidth for billing $B^2_{bc}$ on link $l_2$ is estimated taking into account the transmission of this new datagram. The estimated current bandwidth for billing $B^2_{bc}$ is then compared with the current bandwidth threshold $B^2_{th1}$ previously defined for the link $l_2$. The transmission of this new datagram on link $l_2$ would result for the current bandwidth for billing $B^2_{bc}$ exceeding the current bandwidth threshold $B^2_{th1}$ defined for link $l_2$.

In the present example, link $l_2$ is chosen for routing the datagram. The current bandwidth threshold of link $l_2$ is set equal to the second value $B^2_{th2}$ in the list. The current bandwidth for billing on link $l_2$ increases while remaining below this new defined current bandwidth threshold (which is now $B^2_{th2}$).

At time 813 a new datagram must be routed. The current bandwidth for billing $B^2_{bc}$ on link $l_2$ is estimated taking into account the transmission of this new datagram. The new estimated current bandwidth for billing $B^2_{bc}$ is then compared with the current bandwidth threshold $B^2_{th2}$ defined for the link $l_2$. The transmission of this new datagram on link $l_2$ would result for the current bandwidth for billing $B^2_{bc}$ exceeding the current bandwidth threshold $B^2_{th2}$ defined for link $l_2$. Link $l_1$ is chosen again to route the datagram. The current bandwidth for billing on link $l_1$ increases but remains below the current bandwidth threshold $B^1_{th2}$ defined for link $l_1$.

Link Selection Algorithm

As described in FIG. 9, according to the present invention, steps 900 to 913 are added after the next hop router has been found in the Forwarding Information Base (FIB):

Step 300: upon reception of an IP datagram, searching in the FIB, the entry corresponding to the destination network address of the IP datagram.

Step 301: retrieving
- from the FIB, the IP address of the next hop router ($NH_i$) associated with the destination network address; and
- from the associated Layer two Table, the layer two header corresponding to the next hop router ($NH_i$).

Step 900: checking whether or not the bandwidth usage of link $l_i$ connecting the next hop router ($NH_i$) must be taken into account for routing this IP datagram. In general, the bandwidth usage of a link is considered:
- as important when what is billed is a function of this bandwidth usage.
- as not important either when what is billed is not a function of the bandwidth usage or when the bandwidth usage is free.

Step 913: if the bandwidth usage of the link $l_i$ connecting the next hop router ($NH_i$) must not be taken into account, sending the IP datagram to the next hop router ($NH_i$) (with the layer two header of the next hop router ($NH_i$)) according to steps 302 and 303.

Step 901: if the bandwidth usage of the link $l_i$ connecting the next hop router ($NH_i$) must be taken into account, determining whether or not the IP datagram can be sent to this next hop router ($NH_i$):

Step 902: retrieving the current bandwidth for billing $B^i_{bc}$ of the link $l_i$ from the FIB; and estimating the current bandwidth for billing $B^i_{bc}$ taking into account the IP datagram to transmit.

Step 903: retrieving the current bandwidth threshold $B^i_{thc}$ of link $l_i$ from the FIB; and comparing the estimated current bandwidth for billing $B^i_{bc}$ with the retrieved current bandwidth threshold $B^i_{thc}$:

Step 904: if the estimated current bandwidth for billing does not exceed the current bandwidth threshold, in other words, if the transmission of the IP datagram on link l.sub.i would not result for the current bandwidth for billing B.sup.i.sub.bc in exceeding the current bandwidth threshold B.sup.i.sub.thc:

Step 905 updating in the FIB, the current bandwidth for billing with the estimated bandwidth for billing. The process continues with steps 302 and 303.

Step 906: if the estimated current bandwidth for billing exceeds the current bandwidth threshold, in another words, if the transmission of the IP datagram on link $l_i$ would result for the current bandwidth for billing $B^i_{bc}$ in exceeding the current bandwidth threshold $B^i_{thc}$:

Step 907: checking whether or not another link $l_j$ to another next hop router ($NH_j$) can potentially route the datagram without exceeding the associated current bandwidth threshold. The list of possible links $l_j$ or next hop routers ($NH_j$) is in the Routing Table with the associated costs or distances.

Step 908: if one or a plurality of next hop routers ($NH_j$) can potentially route the IP datagram without exceeding the current bandwidth threshold on link $l_j$:

Step 909: selecting among the one or a plurality of next hop routers ($NH_j$) that can potentially route the IP datagram, a next hop router (NH). This next hop router is generally chosen according to the associated cost or distance (lowest cost or shortest distance).

going back to step 900.

Step 910: if no next hop router ($NH_j$) can route the IP datagram without exceeding the current bandwidth threshold on link $l_j$:

Step 911: selecting among all next hop routers, a next hop router (NH). This next hop router is generally chosen according to the associated cost or distance (lowest cost or shortest distance).

Step 912 updating in the FIB, the value of the current bandwidth threshold with the next value in the list of bandwidth thresholds associated with this next hop router.

going back to step 900.

Step 302: updating the output IP datagram header with the layer two header of the selected next hop router.

Step 303: sending the IP datagram with the updated header to the selected next hop router.

Specific Embodiment

As shown in FIG. 10, according to a specific embodiment of the present invention, the following new information 1000 is added in the Forwarding Information Base (FIB) for each link to next hop router (NH):
a minimum time 1001 to emit a next datagram;
a list of bandwidth thresholds 1002;
a current bandwidth threshold 1003;
a billing period 1004.

Minimum Time to Emit Next Datagram

This value is dynamically computed by the router each time a new datagram must be sent. The Minimum Time to Emit Next Datagram $MTEND_{new}$ is defined as being equal to the previous Minimum Time to Emit Next Datagram $MTEND_{prev}$ (in seconds) plus the size of the datagram dn (in bits) to emit divided by the current bandwidth threshold $B_{thc}$ of the link l to the next hop router (NH):

new Minimum Time to Emit Next Datagram=previous Minimum Time to Emit Next Datagram+Datagram-Size/Current Bandwidth Threshold.

$$MTEND_{n+1} = MTEND_n + dn_{n+1}/B_{thc(n+1)};$$

$$MTEND_{n+1} = MTEND_0 + dn_1/B_{thc1} + \ldots + dn_k/B_{thck} + \ldots + dn_n/B_{thcn} + dn_{n+1}/B_{thc(n+1)};$$

with:
n=number of emitted datagrams;
$MTEND_0 = t_0$;

The term $dn_n/B_{thcn}$ (size of the nth datagram divided by current bandwidth threshold) is equal to the minimum time it takes to transmit a datagram of a given size ($dn_n$) without exceeding the current bandwidth threshold ($B_{thcn}$). The term $dn_n/B_{thcn}$ is also equivalent to the time it takes to transmit the same datagram at a speed equal to the current bandwidth threshold ($B_{thcn}$).

The Minimum Time to Emit Next Datagram is equal to the time before which all datagrams will be transmitted without exceeding the different current bandwidth thresholds. To compute the Minimum Time to Emit Next Datagram, the time periods for transmitting each datagram, are cumulated from the starting time $t_0$ of the billing period P.

Link Selection Algorithm

The link selection algorithm as described in FIG. 11, comprises the steps of:

Step 300: upon reception of an IP datagram, searching in the FIB, the entry corresponding to the destination network address of the IP datagram.

Step 301: retrieving
from the FIB, the IP address of the next hop router ($NH_i$) associated with the destination network address; and
from the associated Layer two Table, the layer two header corresponding to the next hop router ($NH_i$).

Step 1100: checking whether or not the bandwidth usage of link $l_i$ connecting the next hop router ($NH_i$) must be taken into account for routing this IP datagram. In general, the bandwidth usage of a link is considered:
as important when what is billed is a function of this bandwidth usage.

as not important either when what is billed is not a function of the bandwidth usage or when the bandwidth usage is free.

Step 1113: if the bandwidth usage of the link $l_i$ connecting the next hop router ($NH_i$) must not be taken into account, sending the IP datagram to the next hop router ($NH_i$) (with the layer two header of the next hop router ($NH_i$)) according to steps 302 and 303.

Step 1101: if the bandwidth usage of the link $l_i$ connecting the next hop router ($NH_i$) must be taken into account, determining whether or not the IP datagram can be sent to this next hop router ($NH_i$):

Step 1102: retrieving the current time (maintained by the operating system of the router); and Step 1103: retrieving from the FIB, the current Minimum Time to Emit Next Datagram of link $l_i$; and comparing the current time with the current Minimum Time to Emit Next Datagram.

Step 1104: if the current time is greater than or equal to the current Minimum Time to Emit Next Datagram for link l.sub.i, there remains time to send the present IP datagram on link l.sub.i without exceeding the current bandwidth threshold:

Step 1105: computing the new Minimum Time to Emit Next Datagram; and updating the FIS with this new Minimum Time to Emit Next Datagram. The new Minimum Time to Emit Next Datagram is equal to the current Minimum Time to Emit Next Datagram (in seconds) plus the size of the datagram (in bits) divided by the current bandwidth threshold of the link $l_i$: New Minimum Time to Emit Next Datagram=current Minimum Time to Emit Next Datagram+Datagram−Size/Current Bandwidth Threshold. The process continues with steps 302 and 303.

Step 1106: if the current time is lower than the current Minimum Time to Emit Next Datagram for link $l_i$, there is no time available to send the present IP datagram on link $l_i$ without exceeding the current bandwidth threshold. Another link to another next hop router (NH), or another current bandwidth threshold must be selected.

Step 1107 checking whether or not another link $l_j$ to another next hop router ($NH_j$) can potentially route the datagram without exceeding the associated current bandwidth threshold. The list of possible links $l_j$ or next hop routers ($NH_j$) is in the Routing Table with the associated costs or distances.

Step 1108: if one or a plurality of next hop routers ($NH_j$) can potentially route the IP datagram without exceeding the current bandwidth threshold on link $l_j$:

Step 1109: selecting among the one or a plurality of next hop routers ($NH_j$) that can potentially route the IP datagram, a next hop router (NH). This next hop router is generally chosen according to the associated cost or distance (lowest cost or shortest distance).

going back to step 900.

Step 1110: if no next hop router ($NH_j$) can route the IP datagram without exceeding the current bandwidth threshold on link $l_j$:

Step 1111: selecting among all next hop routers, a next hop router (NH). This next hop router is generally chosen according to the associated cost or distance (lowest cost or shortest distance).

Step 1112: updating in the FIB, the value of the current bandwidth threshold with the next value in the list of bandwidth thresholds associated with this next hop router.

going back to step 1100.

Step 302: updating the output IP datagram header with the layer two header of the selected next hop router.

Step 303: sending the IP datagram with the updated header to the selected next hop router.

In prior art, the decision for routing a datagram to a destination network was always based on the shortest path. The shortest path is in fact a cost to reach a destination network. This cost is static (predefined). In the present invention, the shortest path is still taken into account but the routing decision is also based on the bandwidth usage (or current bandwidth for billing) of the link to the next hop router. The bandwidth usage (or current bandwidth for billing) is a dynamic parameter which is updated in the FIB extension in real-time.

While the present invention has been particularly shown and described with reference to a preferred embodiment, it will be understood that various changes in form and detail may be made therein without departing from the spirit, and scope of the invention.

The invention claimed is:

1. A method for routing a datagram in an IP network, said method comprising the steps of:
   a computer receiving a datagram with a destination network address;
   a computer identifying a next hop router en route to or associated with said destination network address; and
   a computer determining whether or not transmission of said datagram on a link to said next hop router would result in a bandwidth usage exceeding a bandwidth threshold associated with said next hop router, and
      if not, updating the bandwidth usage associated with said next hop router, and transmitting said datagram to said next hop router,
      if so, selecting among other possible next hop routers en route to or associated with said destination address, another next hop router for which transmission of said datagram on a link to said other next hop router would not result in a bandwidth usage exceeding a bandwidth threshold associated with said other next hop router, updating the bandwidth usage associated with said other next hop router, and transmitting said datagram to said other next hop router; and
   a computer basing a routing decision on the bandwidth usage of the link to said next hop router,
   wherein the bandwidth usage is a dynamic parameter which is updated in a forwarding information database (FIB) in real-time, and
   wherein the step of determining, comprises the step of adding a bandwidth usage associated with said next hop router immediately before transmission of said datagram on said link to said next hop router to a bandwidth usage required for transmission of said datagram on said link to said next hop router, and comparing a result of said adding step to the bandwidth threshold associated with said next hop router.

2. The method as set forth in claim 1, wherein the step of selecting comprises the steps of:
   if, among said other possible next hop routers, there is no other next hop router for which the transmission of the datagram on the respective link would result in the bandwidth usage being less than the respective bandwidth threshold, choosing among said other possible next hop routers, another next hop router, updating the bandwidth threshold associated with said other, chosen next hop router with a larger, predefined bandwidth threshold; and transmitting the datagram to said other, chosen next hop router.

3. The method as set forth in claim 2, wherein the step of choosing among said other possible next hop routers, comprises the step of choosing among said other possible next hop routers, a next hop router according to a shortest path algorithm.

4. The method as set forth in claim 1, wherein the step of updating the bandwidth usage associated with the first said next hop router, comprises the step of updating in a table, the current bandwidth usage with the estimated bandwidth usage.

5. The method as set forth in claim 1, wherein a bandwidth usage of a link to said next hop router is based on other datagrams that have been transmitted on said link within a time period prior to a current time.

6. The method as set forth in claim 1, further comprising sending an IP datagram with an updated header to a selected next hop router and defining a current bandwidth for billing as an increasing function.

7. The method as set forth in claim 1, further comprising, at a beginning of a billing period, defining a current bandwidth threshold equal to a lowest value in a list of bandwidth thresholds.

8. The method as set forth in claim 1, further comprising, for each link to a next hop router, adding a minimum time to emit a next datagram, a list of bandwidth thresholds, a current bandwidth threshold, and a billing period in the FIB.

9. The method as set forth in claim 1, further comprising, for each link to a next hop router, utilizing a current bandwidth for billing, a list of bandwidth thresholds, a current bandwidth threshold, and a billing period to route traffic.

10. A router for routing a datagram in an IP network, said router comprising:

a system receiving a datagram with a destination network address;

a system identifying a next hop router en route to or associated with said destination network address; and a system determining whether or not transmission of said datagram on a link to said next hop router would result in a bandwidth usage exceeding a bandwidth threshold associated with said next hop router, and if not, updating the bandwidth usage associated with said next hop router, and transmitting said datagram to said next hop router, if so, selecting among other possible next hop routers en route to or associated with said destination address, another next hop router for which transmission of said datagram on a link to said other next hop router would not result in a bandwidth usage exceeding a bandwidth threshold associated with said other next hop router, updating the bandwidth usage associated with said other next hop router, and transmitting said datagram to said other next hop router, wherein the router bases a routing decision on the bandwidth usage of the link to said next hop router and on a bandwidth usage as billed by an ISP on the links to the next hop routers, wherein the bandwidth usage is a dynamic parameter which is updated in a forwarding information database (FIB) in real-time, and wherein the step of determining, comprises the step of adding a bandwidth usage associated with said next hop router immediately before transmission of said datagram on said link to said next hop router to a bandwidth usage required for transmission of said datagram on said link to said next hop router, and comparing a result of said adding step to the bandwidth threshold associated with said next hop router.

11. A router as set forth in claim 10, wherein the determining system determines that transmission of said datagram on a link to said next hop router would result in a bandwidth usage exceeding a bandwidth threshold associated with said next hop router, and among said other possible next hop routers, there is no other next hop router for which the transmission of the datagram on the respective link would result in the bandwidth usage being less than the respective bandwidth threshold, and in response, chooses among said other possible next hop routers, another next hop router, updates the bandwidth threshold associated with said other, chosen next hop router with a larger, predefined bandwidth threshold; and transmits the datagram to said other, chosen next hop router.

12. The router as set forth in claim 10, further comprising a system sending an IP datagram with an updated header to a selected next hop router and a system defining a current bandwidth for billing as an increasing function.

13. The router as set forth in claim 10, wherein, for each link to a next hop router, a minimum time to emit a next datagram, a list of bandwidth thresholds, a current bandwidth threshold, and a billing period is added in the FIB.

14. The router as set forth in claim 10, wherein, for each link to a next hop router, a current bandwidth for billing, a list of bandwidth thresholds, a current bandwidth threshold, and a billing period are utilized to route traffic.

* * * * *

UNITED STATES PATENT AND TRADEMARK OFFICE
CERTIFICATE OF CORRECTION

PATENT NO.      : 7,660,255 B2                                        Page 1 of 1
APPLICATION NO. : 10/690015
DATED           : February 9, 2010
INVENTOR(S)     : Berthaud et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1307 days.

Signed and Sealed this

Thirtieth Day of November, 2010

David J. Kappos
*Director of the United States Patent and Trademark Office*